United States Patent

[11] 3,603,785

| [72] | Inventor | Alfred Dickens Baker<br>Solihull, England |
|---|---|---|
| [21] | Appl. No. | 796,327 |
| [22] | Filed | Feb. 4, 1969 |
| [45] | Patented | Sept. 7, 1971 |
| [73] | Assignee | Joseph Lucas (Industries) Limited<br>Birmingham, England |
| [32] | Priority | Feb. 9, 1968 |
| [33] | | Great Britain |
| [31] | | 6460/68 |

[54] HEADLAMP ADJUSTING SYSTEMS
8 Claims, 2 Drawing Figs.

[52] U.S. Cl. .................................... 240/61.1,
240/62.3
[51] Int. Cl. ...................................... B60q 1/10
[50] Field of Search ............................ 240/61.1,
61.2, 61.4, 61.5, 62.3, 7.1, 46.03, 46.05

[56] References Cited
UNITED STATES PATENTS

| 1,967,515 | 7/1934 | Ricker | 240/46.05 X |
| 2,846,551 | 8/1958 | Linder et al. | 240/7.1 X |
| 3,177,355 | 4/1965 | Trowbridge | 240/7.1 |
| 3,370,162 | 2/1968 | Henry-Biabaud | 240/62.3 X |
| 3,402,287 | 9/1968 | Hindman | 240/62.3 X |
| 3,453,424 | 7/1969 | Cibie | 240/7.1 |

FOREIGN PATENTS

| 33,967 | 10/1928 | France | 240/62.3 |
| 1,458,985 | 10/1966 | France | 240/61.1 |
| 290,228 | 8/1929 | Great Britain | 240/61.1 |
| 280,250 | 2/1929 | Great Britain | 240/61.1 |

*Primary Examiner*—Samuel S. Matthews
*Assistant Examiner*—Robert P. Greiner
*Attorney*—Holman & Stern ABSTRACT: In a headlamp adjusting system there is provided a member movable in opposite directions to adjust the position of a headlamp of a vehicle relative to the body of the vehicle so that its beam is tilted upwardly or downwardly respectively. A first piston and cylinder arrangement operatively interconnects the body and the wheel of the vehicle so that movement of the body relative to the wheel moves the piston relative to the cylinder. A second piston and cylinder arrangement is provided for controlling movement of the member associated with the headlamp relative to the body of the vehicle. A conduit interconnects the two piston and cylinder arrangements so that the flow of fluid through the conduit causes movement of the member to adjust the position of the headlamp. A valve is provided in the fluid line between the first and second piston and cylinder arrangements and the valve is operable to prevent flow of fluid between the piston and cylinder arrangements so that the headlamp is not adjusted when the valve is operative. The valve is operated to prevent fluid flow while the vehicle is traveling so that the headlamp position is not adjusted as a result of suspension movements of the vehicle when the vehicle is traveling.

HEADLAMP ADJUSTING SYSTEMS

This invention relates to headlamp adjusting systems for road vehicles.

A headlamp adjusting system according to the invention includes a member movable in opposite directions to adjust a headlamp of a vehicle so that its beam is tilted upwardly and downwardly respectively, a first piston and cylinder arrangement operatively interconnecting the body and a wheel of the vehicle so that movement of said body relatively towards or away from said wheel moves said piston relative to said cylinder, a second piston and cylinder arrangement controlling movement of said member relative to the body of the vehicle, a conduit interconnecting the cylinder of the two piston and cylinder arrangements so that flow of fluid through the conduit causes movement of said member to adjust the headlamp, and means for controlling flow of fluid from said first piston and cylinder arrangement to said second piston and cylinder arrangement so that said member is not moved as a result of suspension movements of the vehicle when the vehicle is travelling.

One example of the invention is illustrated in the accompanying drawings wherein.

Figure 1:
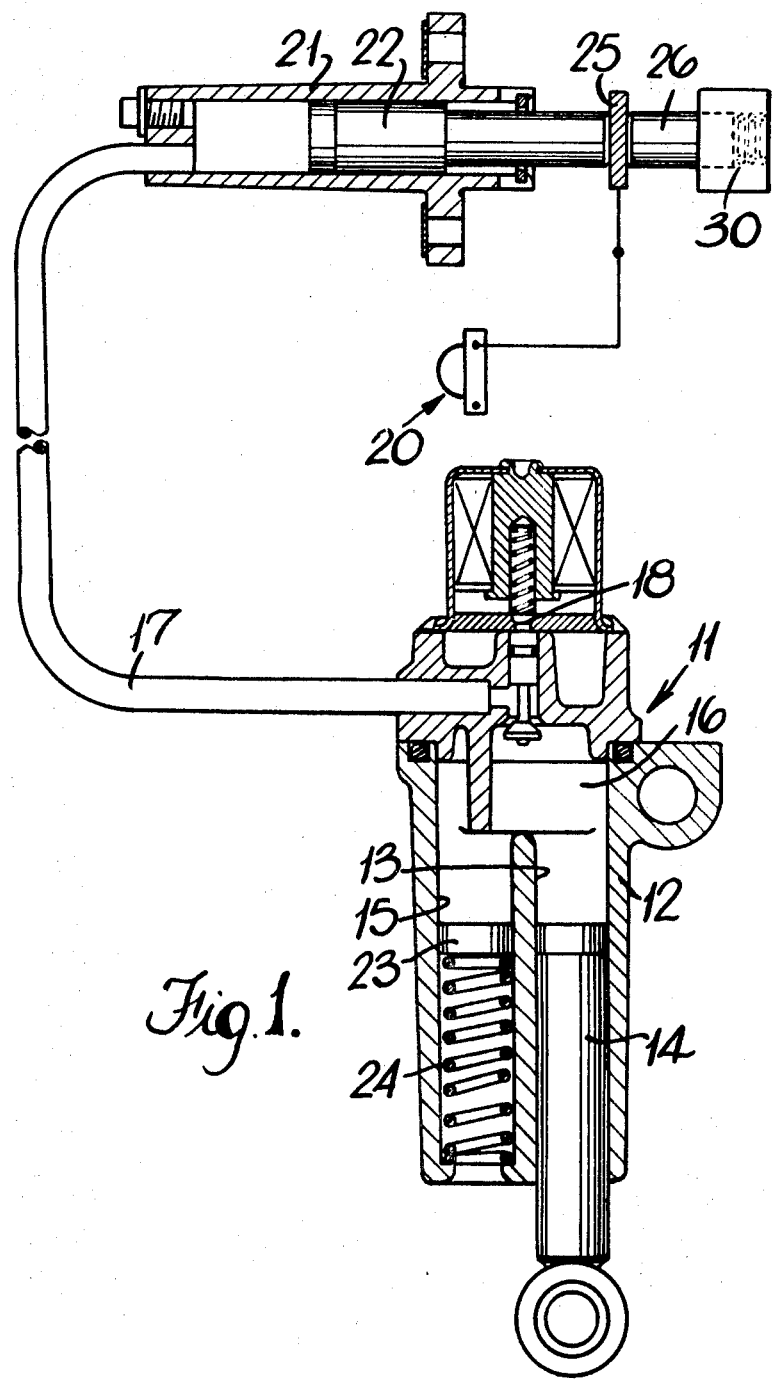
FIG. 1 is a fragmentary sectional view of the headlamp adjusting system.

Referring first to FIG. 1 the headlamp adjusting system includes a sensing unit 11 having a hollow casing 12 which is mounted on the rear portion of the body of a road vehicle. Defined within the casing 12 is a first cylinder 13 having slidable therein a piston 14, which at one end is secured to one of the rear suspension members of the road vehicle. The cylinder 13 and a second cylinder 15 parallel with the cylinder 13 both communicate with a chamber 16 in the casing 11, and the chamber 16 and the cylinders 13, 15 are filled with hydraulic fluid. The chamber 16 communicates with a conduit 17 by way of a solenoid controlled valve 18, and communicating with the conduit 17 at its end remote from the unit 11 is a cylinder 21 which is secured to the body of the road vehicle and which receives as a sliding fit, a piston 22. A second piston 23 is housed within the cylinder 15 and is urged by a spring 24 in a direction to reduce the volume of the cylinder 15. The free end of the piston 22 bears against a member 25 which is movable in opposite directions to adjust the headlamps 20 of the vehicle so as to tilt their beams upwardly or downwardly. A plunger 26 bears against the opposite side of the member 25 and is urged by a spring 30 in a direction to push the piston 22 into its cylinder 21.

The solenoid-operated valve 18 is closed when the solenoid of the valve is deenergized thereby isolating the chamber 16 and the cylinders 13, 15 from the conduit 17. When the valve 18 is closed and relative movement occurs between the body of the road vehicle and the suspension member of the road vehicle to which the piston 14 is secured, then the fluid displaced by movement of the piston 14 relative to the cylinder 13 is taken up by downward movement of the piston 23 against the action of the spring 24.

The solenoid of the valve 18 is energized when the ignition circuit of the road vehicle is broken or when either of the rear doors of the vehicle or (in the case of a two door vehicle, either door) or the boot of the vehicle is opened. When the solenoid is energized, the valve 18 will be opened and, assuming that the load at the rear of the vehicle is increased, fluid displaced by the relative movement between the piston 14 and the cylinder 13 as a consequence of the loading of the vehicle will be transmitted to the cylinder 21 through the conduit 17, and the piston 22 will be pushed outwardly thereby moving the member 25 against the action of the plunger 26. The arrangement is such that loading of the rear of the vehicle will move the member 25 so that the headlamps are tilted downwardly to compensate for the upward movement of the front of the vehicle which accompanies loading of the rear of the vehicle.

It will be appreciated that in the event that the front of the vehicle is loaded then the system will operate to withdraw the piston 22 into the cylinder 21 and the member 25 will be moved under the action of the spring-loaded plunger 26 to adjust the headlamps in such a manner that their beams are titled upwardly so as to compensate for the downward movement of the front of the vehicle.

Figure 2:
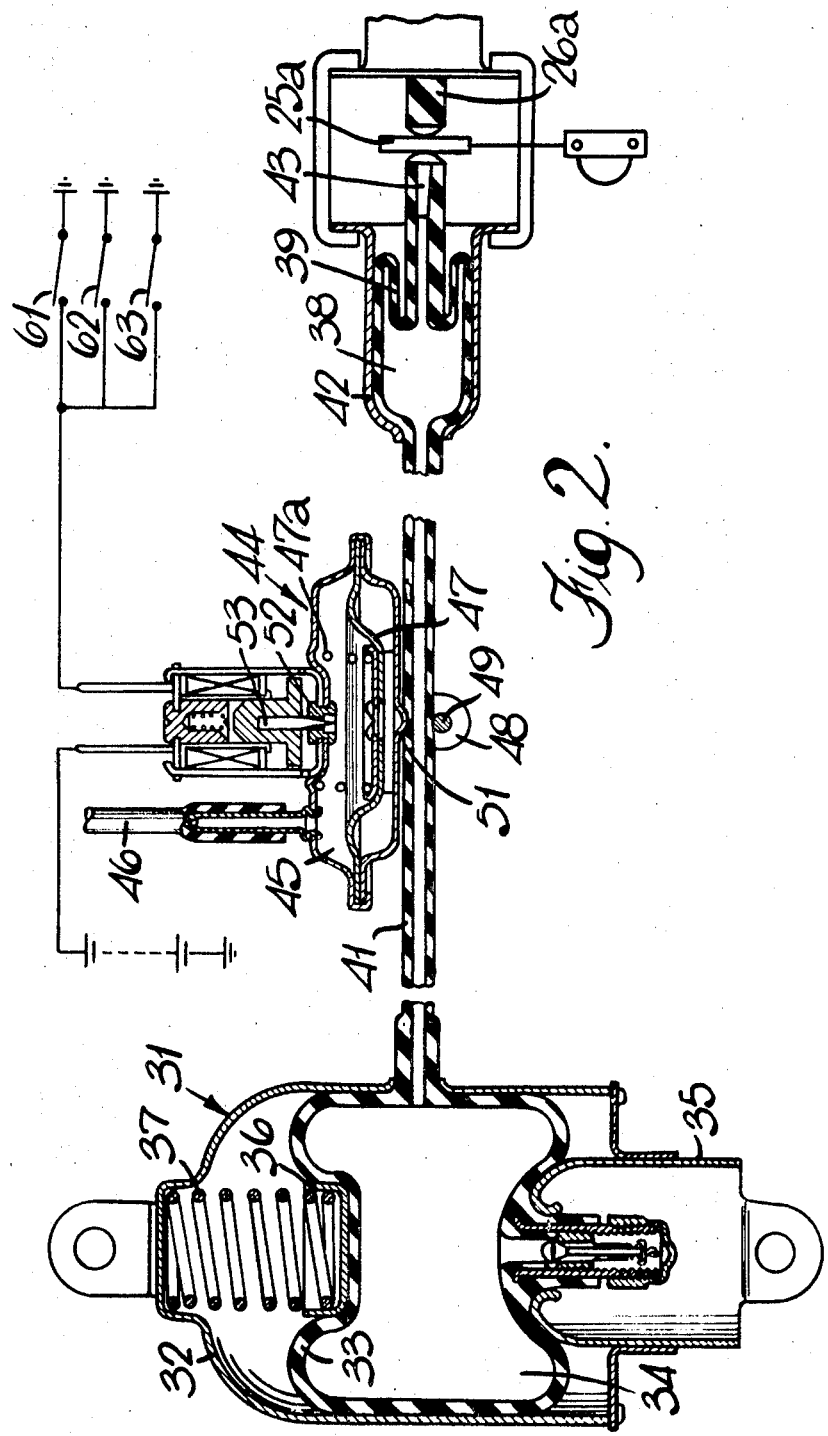
FIG. 2 is a view similar to FIG. 1 of a second example.

Referring now to FIG. 2, the headlamp adjusting system includes a sensing unit 31 having a hollow cylindrical casing 32 which is secured to the rear part of the body of the road vehicle. The casing 32 houses a flexible member 33 in the form of a pair of integral opposed rolling diaphragms, which define between them a chamber 34 the volume of which is variable by flexure of either of the diaphragms. One of the diaphragms of the member 33 is engaged by one end of a piston 35, which is slidably mounted within the casing, the other end of the piston being secured to one of the rear suspension members of the vehicle. The other diaphragm of the member 33 is engaged by a plunger 36 which is urged by a spring 37 acting against the casing 32, in a direction to reduce the volume of the chamber 34. The chamber 34 is filled with hydraulic fluid and communicates with a remotely positioned chamber 38 through a flexible conduit 41. The walls of the chamber 38 are defined by a flexible member which includes a rolling diaphragm 39, the walls of the chamber 38, with the exception of the diaphragm 39, being held against flexure by an outer casing 42. Integral with the diaphragm 39 is a plunger 43 which bears against one face of a member 25a which is movable to control the headlamps of the vehicle in the same way as the member 25 in FIG. 1. A spring-loaded plunger 26a bears against the opposite face of the member 25a, and urges the member 25a into engagement with the plunger 43.

When the piston 35 is moved relative to the casing 32 owing to movements of the rear of the body of the vehicle relative to the rear heels of the vehicle hydraulic fluid flows to or from the chamber 38 and there is consequential movement of the member 25 to adjust the headlamps.

In order that the headlamps shall not be adjusted in response to normal suspension movements of the vehicle when the vehicle is travelling, there is provided a control mechanism 44 for isolating the chamber 38 from the chamber 34. The mechanism 44 includes a chamber 45 which is connected by way of a conduit 46 to the inlet manifold of the engine of the vehicle. One wall of the chamber 45 is defined by a diaphragm 47 which is urged in a direction to increase the volume of the chamber 45 by a spring 47a. A pair of parallel legs 48 (only one of which is shown in FIG. 2) are secured to the diaphragm 46 and are movable therewith. The legs 48 extend through the outer casing of the mechanism 44 and are interconnected by a rigid bar 49. Between the legs 48 the outer casing of the mechanism 44 is formed with a raised projection 51, and the flexible conduit 41 is passed between the legs 48 so that it can be trapped between the bar 49 and the projection 51. Thus when the engine of the vehicle is running the chamber 45 will be partially exhausted through the conduit 46 and the diaphragm 47 will be moved against the action of the spring 47a thereby withdrawing the legs 48 into the outer casing of the mechanism 44 and pinching the flexible conduit 41 between the bar 49 and the projection 51 of the casing of the mechanism 44.

The chamber 45 includes a bleed orifice 52 which is normally closed by a movable needle 53. The needle 53 is secured to the armature of a solenoid 54 so that when the solenoid is energized the needle is moved to open the bleed orifice 52 and thereby place the chamber 45 in communication with atmosphere, so that the diaphragm 47 can be moved under the action of the spring 47a to release the flexible conduit 41 so as to place the chamber 38 in communication with the chamber 34 of the unit 31.

The solenoid 54 is electrically connected with switches 61, 62, 63 on both rear doors of the vehicles and on the boot lid of the vehicle, and the arrangement is such that in the event that either of the rear doors or the boot lid of the vehicle are opened then the solenoid 54 is energized to open the bleed orifice 52. Thus it will be appreciated that when either of the rear doors or the boot lid of the vehicle is opened then the headlamp adjusting system is operative, and moreover since the chamber 45 of the mechanism 44 is connected to the inlet manifold of the engine of the vehicle through the conduit 46, then when the engine is switched off the partial vacuum in the chamber 45 will be lost and the headlamp adjusting system will be rendered operative.

In use, assuming that the mechanism 44 has released the flexible conduit 41, and a load is applied to the rear of the vehicle in a manner to move the rear part of the body of the vehicle towards the wheels of the vehicle, then the casing 32 of the member 31 will be pushed downwardly relative to the piston 35 of the unit 31, thereby deforming the resilient member 33 and reducing the volume of the chamber 44. The fluid expelled from the chamber 34 passes along the conduit 41 and serves to increase the volume of the chamber 38 by deforming the diaphragm, the plunger 43 being pushed to the right in the drawing against the action of the plunger 26, and the member 25 being moved to adjust the headlamps to compensate for the lowering of the rear of the vehicle. It will be appreciated that should the front of the vehicle be loaded then the flow of fluid will be from the chamber 38 into the chamber 34 and the headlamps will be adjusted in the opposite sense to compensate for lowering of the front of the vehicle.

When the mechanism 44 is in an operative condition and the flexible conduit 41 is pinched thereby isolating the chamber 34 from the chamber 38, then movements of the piston 35 relative to the casing 32 of the unit 31 cannot expel hydraulic fluid from the chamber 34 and so cannot alter the volume of the chamber 34. Thus the relative movement between the casing 32 and the plunger 35 is taken up by deformation of the member 33 under the control of the spring 37 and the plunger 36.

In a modification of the example shown in FIG. 1, the spring-loaded plunger 26 is replaced by the piston of a second piston and cylinder arrangement of the same form as the arrangement 21,22, the second piston and cylinder arrangement being controlled in the same way as the arrangement 21, 22 by a second sensing unit which acts between the front part of the vehicle body and a front suspension member of the vehicle. The valve 18 of one of the units can be omitted if the pistons of the two piston and cylinder units 21, 22 are interconnected.

FIG. 2 can be modified in a similar way using units 31 and 44, controlled by the front suspension, to operate another piston 43 instead of using the plunger 26a. If the two pistons 43 are interconnected, only one control mechanism 44 is required.

Having thus described my invention what I claim as new and desire to secure by Letters Patent is:

1. A headlamp adjusting system for a road vehicle including a member movable in opposite directions to adjust a headlamp of a vehicle so that its beam is tilted upwardly or downwardly respectively, a first piston and cylinder arrangement connected between the body and the wheel of the vehicle so that movement of the body relatively towards or away from the wheel moves the piston within said cylinder, a second piston and cylinder arrangement controlling movement of said member relative to the body of the vehicle, a conduit interconnecting the first and second cylinders so that flow of fluid through the conduit causes movement of said member to adjust the headlamp in accordance with the movement of the body of the vehicle relative to the wheel of the vehicle, means operable to prevent flow of fluid from the first cylinder to the second cylinder when the vehicle is travelling, so that the member is not moved as a result of suspension movements of the vehicle while the vehicle is travelling, and means for absorbing movements of the first piston relative to the first cylinder as a result of suspension movement of the vehicle when said means for controlling fluid flow is operative.

2. S system as claimed in claim 1 in which the means for controlling flow of fluid is a valve which blocks flow of fluid from the first piston and cylinder arrangement to the conduit.

3. A system as claimed in claim 1 in which the means for controlling flow of fluid is a control device which when operative restricts the conduit to prevent flow therethrough.

4. A system as claimed in claim 1 in which said member is resiliently urged in one direction and is moved in the other direction by the second piston and cylinder arrangement.

5. A system as claimed in claim 2 in which flow of fluid between said first and second piston and cylinder arrangements is permitted only when the ignition circuit of the vehicle is broken.

6. A system as claimed in claim 1 in which the first piston and cylinder arrangement acts between the body and a wheel of the vehicle, the system including a third piston and cylinder arrangement connected between the body and a wheel of the vehicle at the opposite end of the vehicle from the first piston and cylinder arrangement, a fourth piston and cylinder arrangement, the second and fourth piston and cylinder arrangements moving said member in opposite directions respectively, a second conduit interconnecting the cylinders of the third and fourth piston and cylinder arrangements, and second control means acting in the same way as the first control means but to control fluid flow between the cylinders of the third and fourth piston and cylinder arrangements.

7. A system as claimed in claim 6 modified in that the pistons of the second and fourth piston and cylinder arrangements are mechanically interconnected and one of the control means is omitted.

8. A system as claimed in claim 3 in which flow of fluid between the piston and cylinder arrangements is permitted only when the ignition circuit of the vehicle is broken.